United States Patent [19]
Gallagher et al.

[11] 3,984,846
[45] Oct. 5, 1976

[54] PHOTORECEPTOR ASSEMBLY FOR AUTOMATIC FOCUSING SYSTEM

[76] Inventors: John A. Gallagher, Box 285-Rte. 1, Barrington, Ill. 60010; Kenneth L. Hendrickson, 7301 N. Ridge Blvd., Chicago, Ill. 60645; Robert F. Johnston, 1112 Valley Drive, Wildwood, Ill. 60030; John A. Thiel, 1260 Anthony Road, Wheeling, Ill. 60090

[22] Filed: Jan. 2, 1975

[21] Appl. No.: 538,228

[52] U.S. Cl. ............................ 354/25; 33/125 A; 250/204; 250/215; 250/234; 250/578; 356/4
[51] Int. Cl.² ...................... G03B 3/10; G01C 3/08
[58] Field of Search .................... 354/25; 33/125 A; 356/4, 8; 250/204, 215, 234, 578

[56] References Cited
UNITED STATES PATENTS

| | | | |
|---|---|---|---|
| 3,442,193 | 5/1969 | Pagel | 354/25 |
| 3,736,057 | 5/1973 | Harvey | 354/25 |
| 3,836,919 | 9/1974 | Matsumoto et al. | 354/25 |

*Primary Examiner*—Joseph F. Peters, Jr.

[57] ABSTRACT

A photographic apparatus having a lens movable along an axis for automatically focusing an object to be photographed is disclosed. The apparatus includes a rotatable sleeve controlled by electrical signals produced by photoreceptor means adapted to receive light emitted by the apparatus and reflected from the object. The sleeve effectuates the movement of the lens along an axis to bring the object into focus. The apparatus further includes assembly means, carrying the photoreceptor means, pivotably secured to the sleeve for adjusting the light received by the photoreceptor means by an amount corresponding to the rotation of the sleeve, thereby changing the electrical signals to maintain the object in focus.

15 Claims, 4 Drawing Figures

PHOTORECEPTOR ASSEMBLY FOR AUTOMATIC FOCUSING SYSTEM

BACKGROUND OF THE INVENTION

This invention relates to photographic apparatus of the type having a rotatable sleeve encompassing an objective lens. The lens is movable along a longitudinal axis for automatically focusing any object within a predetermined focusing range. More particularly this invention can be used in conjunction with an "Automatic Focusing System" disclosed by Hendrickson and Johnston in a patent application filed Ser. No. 536,666 filed on Dec. 26, 1974 herewith and assigned to the same assignee.

Photograhic apparatus of the type described include means for emitting a beam of light toward the object to be photographed, and photoreceptor means adapted to receive a portion of the light beam reflected from the object. The photoreceptor means produce a pair of electrical signals, corresponding to the amount of light received. As explained in detail in the above-described disclosure of Hendrickson and Johnston, the electrical signals are passed through circuitry for energizing mechanical means, including an electric motor. The electric motor turns the rotatable sleeve, thereby automatically moving the objective lens along the longitudinal axis toward a position for properly focusing the object.

The present invention most particularly relates to a mechanism which permits the photorecpetor means to be pivoted relative to the photographic apparatus upon automatic adjustment of th rotatable sleeve. This pivoting action of the photoreceptor means tends to equalize the strength of the electrical signals produced thereby. When the electrical signals are so equalized, electric circuitry de-energizes the electric motor, thereby maintaining the objective lens in proper position for focusing the object to be photographed.

SUMMARY OF THE INVENTION

This invention pertains to a photographic apparatus having a lens movable along an axis for automatically focusing an object to be photographed. Emission means secured to the apparatus emit a light beam toward the object, at least two photoreceptor means each adapted to receive a portion of light beam reflected from the object for respectively producing electrical signals corresponding to the portion of the light beam so received, and means responsive to the electrical signals adapted to produce difference signal corresponding to the extent to which the object is out of focus, are also provided. The apparatus includes a rotatable sleeve controlled by the difference signal for effectuating the movement of the lens along the axis to bring the object into focus. An assembly, carrying the photoreceptor means, is movably secured to the sleeve for adjusting the light reflected from the object and received by the photoreceptor means by an amount corresponding to the rotation of the sleeve, thereby changing the difference signal to maintain the object in focus.

BRIEF DESCRIPTION OF THE DRAWINGS

An exemplary embodiment of the invention summarized above is illustrated in the accompanying drawings in which.

DETAILED DESCRIPTION OF AN EXEMPLARY EMBODIMENT

Before describing the photographic apparatus of the invention with particularity, a general explanation of the operation of the exemplary embodiment would be helpful. In brief, a photographic apparatus such as a camera is provided with means for producing a light beam adapted to impinge on an object to be photographed.

A portion of the light beam is reflected from the object and received at a pair of photoreceptors disposed in spaced relationship on the camera. Each of the photoreceptors produce electrical signals, corresponding to the amount of light received. The electrical signals are then passed to electric circuitry which produce a difference signal corresponding to the difference in strength between the electrical signals produced by the photoreceptors.

The difference signal is ultimately passed to mechanical means including an electric motor. The electric motor is linked to a sleeve, encompassing an objective lens movable along a longitudinal axis. Upon energization by the difference signal, the electric motor causes the lens to move along the longitudinal axis toward a position which would bring the object into proper focus. In this exemplary embodiment, an assembly, housing the photoreceptors is mechanically linked to the sleeve, whereby movement of the sleeve causes movement of the photoreceptors in a manner which tends to equalize the amount of the reflected light striking the photoreceptors. This results in an absolutely minimal difference signal which effects a minimal response from the motor. Accordingly, the lens is maintained in position along the longitudinal axis to keep the selected object in focus.

Figure 1:
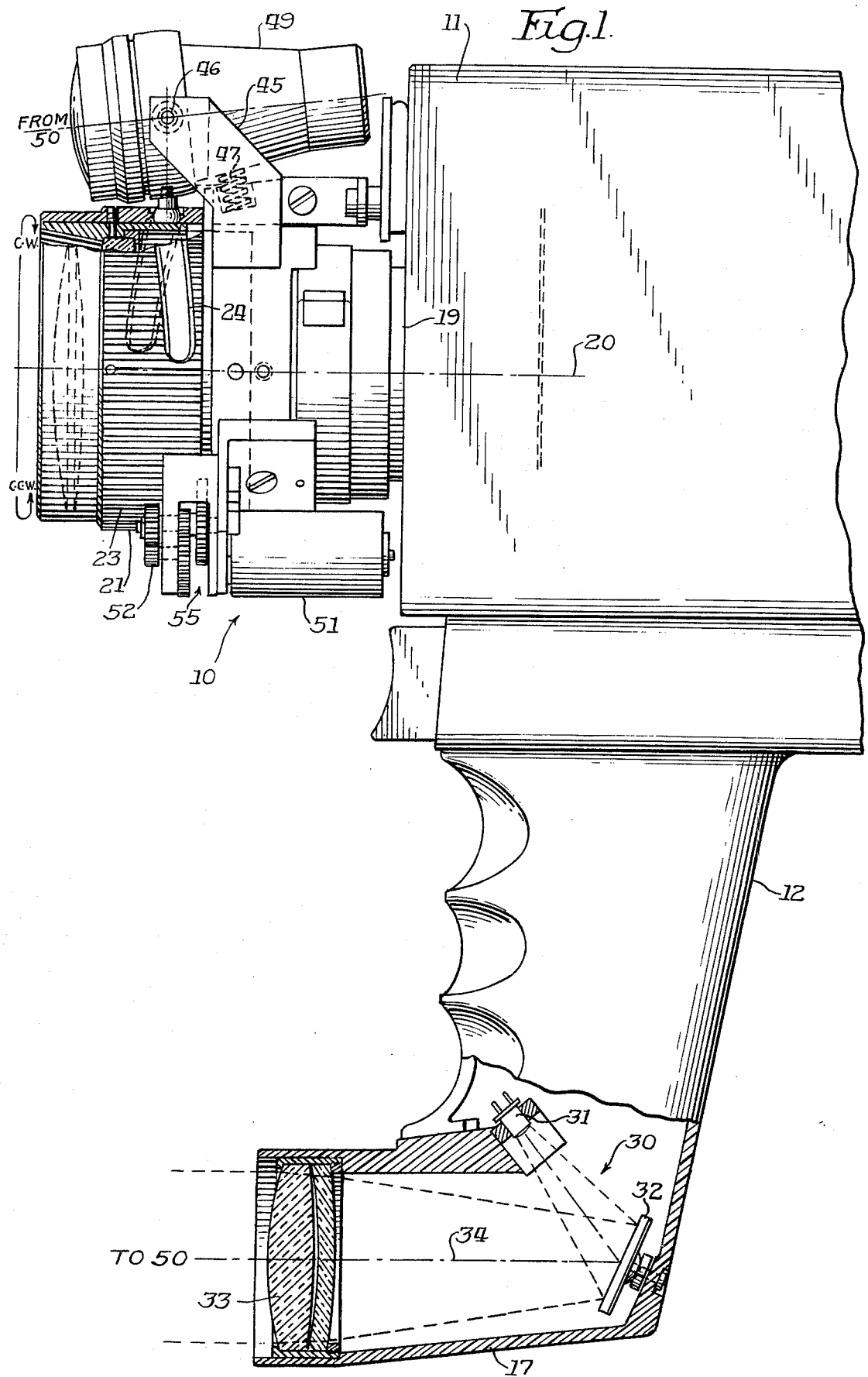
FIG. 1 is a side view of a photographic apparatus embodying the invention.
Figure 2:
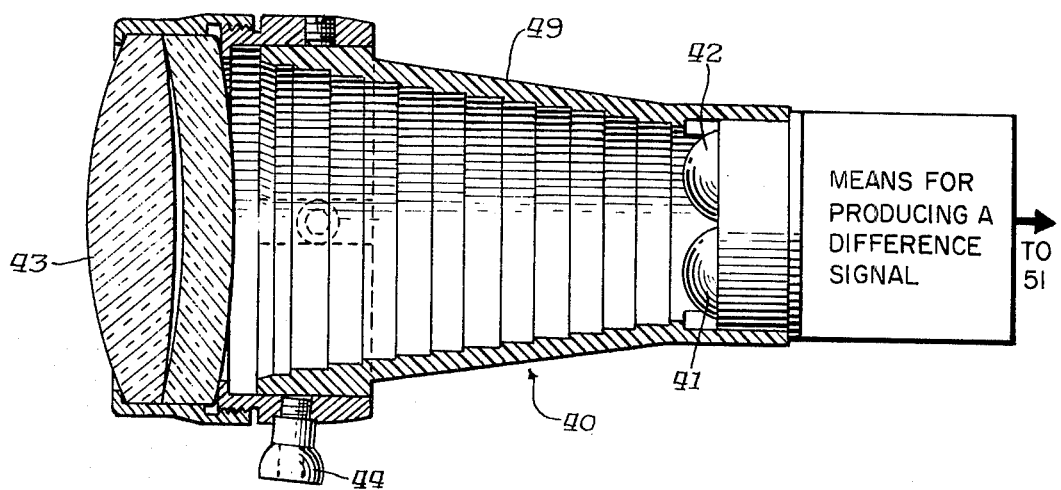
FIG. 2 is an enlarged, sectional view of a portion of the photographic apparatus shown in FIG. 1.
Figure 3:
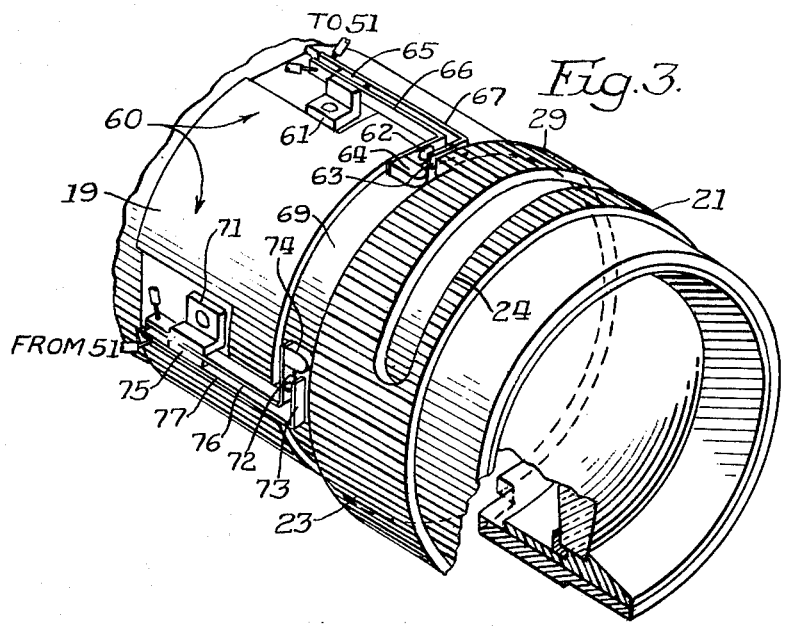
FIG. 3 is an enlarged, perspective view of another portion of the photographic apparatus shown in FIG. 1.

Referring now to the drawings, and in particular to FIGS. 1–3, a photographic apparatus such as a camera is represented generally by reference numberal 10. Camera 10 comprises a lightproof enclosure 11, having means for aligning a light sensitive film (not shown) with an objective lens 22. Objective lens 22 is supported by an annular barrel 19 which is encompassed by a rotatable sleeve 21. Disposed on the periphery of sleeve 21 are a plurality of teeth 23, and a cam following track 24 whose function is explained hereinafter. Sleeve 21 is rigidly joined to lens 22 in a well-known manner so that, upon rotation of sleeve 21, both sleeve 21 and lens 22 move along a longitudinal axis 20. Axis 20 is conventionally aligned with photosensitive film inside enclosure 11 and lens 22. Thus, for example, the counterclockwise rotation of sleeve 21 may advance lens 22 along axis 20 toward enclosure 11, and the clockwise rotation of sleeve 21 may move lens 22 in the opposite direction. The clockwise (cw) and counterclockwise (ccw) directions are determined by looking through the objective lens toward the object and are indicated by the appropriately designated arrowheads in FIG. 1.

Secured to enclosure 11 of camera 10 is a handle 12 having a forwardly projecting member 17. Disposed inside handle 12, and in particular, disposed inside member 17 are emission means designated by reference numeral 30. In this exemplary embodiment, emission means 30 include a light emitting diode 31, such as General Electric No. SSL-55C, adapted to produce a light beam directed at the object to be photographed. A mirror 32, disposed inside handle 12, is adapted to receive the train of light signals from diode 31 and reflect it through projecting member 17 to optical means 33. Optical means 33 directs the light beam from mirror 32 outside camera 10 along an axis 34 which is preferably parallel to longidutinal axis 20.

When lens 22 of camera 10 is directed toward an object to be photographed, the light beam from emission means 30 will impinge upon, and then be reflected from that object. A portion of these reflected light signals will be received at reception means 40 mounted on camera 10. As shown most clearly in FIG. 2, reception means 40 include first and second photoreceptors 41 and 42 disposed in spaced relationship inside an assembly 49. Photoreceptors 41 and 42 are preferably pin photo diodes, such as EGG type SGD-040L, which conventionally produce an electrical signal corresponding to the amount of light received. To insure that light reflected form the object is always passed to at least one of photoreceptors 41, 42, a lens 43 is secured at the forward end of assembly 49.

Assembly 49 is mounted on camera 10 by a rigid linkage 45. More particularly, linkage 45 is fixedly attached to the camera body, and secured through pivot means 46 to assembly 49. A coiled spring 47 applies a force against assembly 49 to urge the forward portion of reception means 40, including lens 43, down toward sleeve 21. Opposing the force of spring 47 is a cam 44, extending downwardly from assembly 49 and adapted to engage cam-following track 24 in sleeve 21.

Figure 4:
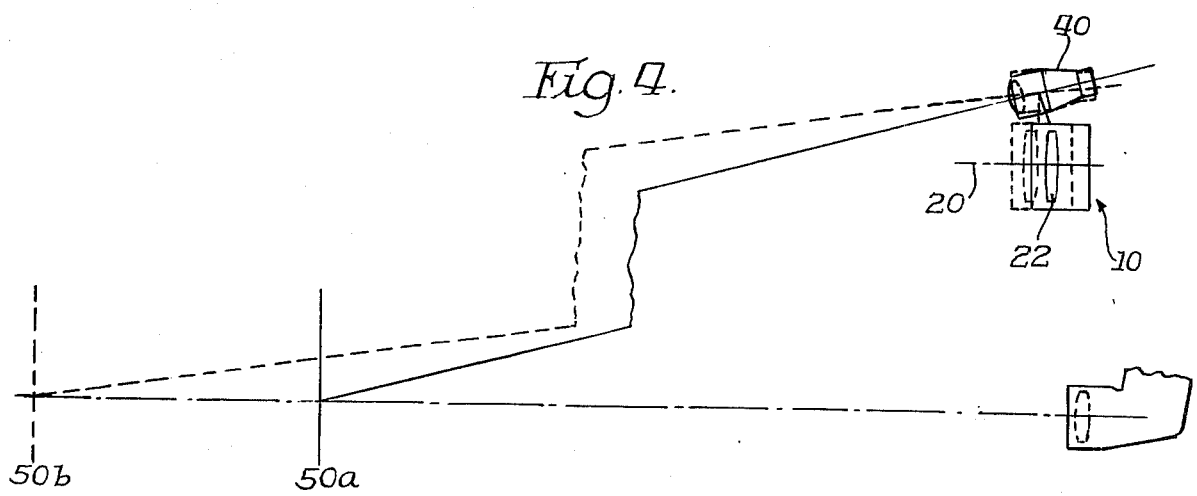
FIG. 4 is a schematic, fragmented illustration of the photographic apparatus of FIG. 1 showing adjustments for focusing relatively near and far objects.

As shown in FIG. 1, cam-following track 24 is characterized by a slight pitch as it curves about the periphery of sleeve 21. Thus, when sleeve 21 is rotated to effect focusing of an object by lens 22, assembly 49 pivots about means 46. As a result, depending on the direction in which sleeve 21 is rotated, lens 43 of housing 49 is either moved closer to or further from sleeve 21. The pivoting capability of reception means 40 enables photoreceptors 41, 42 to receive reflected light from either near or far objects designated at 50a and 50b, respectively in FIG. 4. In this exemplary embodiment, automatic focusing by camera 10 is limited to objects no nearer than 5 feet and no further than 25 feet, though objects exceeding these limits may be manually focused by rotating sleeve 21 by hand.

The reflected light received by reception means 40 causes electrical signals to be produced by photoreceptors 41 and 42. As explained in the hereinbefore identified disclosure of Hendrickson and Johnston electric circuitry (not shown) responds to these signals by producing a difference signal which is adapted to energize mechanical means 55, including an electric motor 51. Upon energization, motor 51 effects movement of a circular gear 52 which in turn cooperates with teeth 23 to automatically rotate sleeve 21. The rotation of sleeve 21 causes lens 22 to move along axis 20, thereby bringing object 50 into focus. As explained immediately hereinafter, means are provided for automatically de-energizing motor 51 when near or far limits for automatic focusing are exceeded. In the present embodiment the near and far limits for automatically focusing camera 10 are five feet and twenty-five feet, respectfully.

As shown in FIG. 3, the camera includes switch means 60 comprising a normally closed near limit switch 61 and a normally closed far limit switch 71. In this embodiment. limit switch 61 includes a pair of L-shaped spring conductors 66, 67 disposed in a recess 69 of barrel 19. Conductors 66 and 67 are separated at their proximal ends by an insulating block 65, forcing together a pair of facing contacts 62, 63 at their respective distal ends to maintain switch 61 closed. Limit switch 61 further includes a non-conducting projection 64 secured to the distal end of conductor 66 and extending into recess 69.

Extending from sleeve 21 is a pressure edge 29 which remains out of engagement with projection 64 when sleeve 21 is rotated to adjust lens 22 for focusing ojbects within the near limit of camera 10. However, when sleeve 21 is rotated to effect adjustment of lens 22 for focusing objects closer than the near limit, pressure edge 29 engages projection 64, forcing contact 62 away from contact 61, thereby opening switch 61. Since switch 61 is connected in series with electric motor 51, the separation of contacts 62 and 63 by projection 64 causes the electric motor to be de-energized.

Similarly, far limit switch 71 includes a pair of L-shaped spring conductors 76, 77 also disposed in recess 69. Conductors 76 and 77 are separated at their proximal ends by another insulating block 75, forcing together a pair of facing contacts 72, 73 at their respective distal ends to maintain switch 71 closed. Limit switch 71 further includes a non-conducting projection 74 secured to the distal end of conductor 76 and extending into recess 69. Pressure edge 29 of sleeve 21 remains out of engagement with projection 74 when sleeve 21 is rotated to adjust lens 22 for focusing objects within the far limit of camera 10. When sleeve 21 is manually rotated to effect adjustment of lens 22 for objects further than the far limit of camera 10, however, pressure edge 29 engages projection 74, forcing contact 72 away from contact 73, thereby opening switch 71. Since switch 71 is also connected in series with electric motor 51, motor 51 will be de-energized if sleeve 21 is rotated to move lens 22 in position for focusing objects less than 5 feet or greater than 25 feet from the camera.

Camera 10 is constructed so that the object to be photographed is properly focused when the amount of light striking photoreceptors 41 and 42 is equal. Under these circumstances, the electrical signals produced by photoreceptors 41 and 42 will also be equal and, as a result, an absolute minimal difference signal will be produced, thereby effecting a minimal response from motor 51. Accordingly, sleeve 21 and hence lens 22 will be maintained in place and the object will remain in focus.

If, however, lens 22 is improperly adjusted, the amount of the reflected light striking one of the photoreceptors will exceed that of the other. For example, if lens 22 is adjusted for a relatively near object, and the object to be focused is relatively far, more reflected light may strike photoreceptor 41 than photoreceptor 42. Accordingly, a difference signal having a first polarity will be developed causing the energization of motor 51. Upon energization, motor 51 will rotate sleeve 21 counterclockwise, thereby moving lens 22 toward enclosure 11 to bring the far object into focus. The counterclockwise rotation of sleeve 21, however, will simultaneously cause reception means 40 to pivot so that lens 43 moves upwardly, away from sleeve 21. This shift in position of lens 43 tends to equalize the amount of reflected light striking photoreceptors 41, 42. As a result, an absolutely minimal difference signal is produced which allows sleeve 21 and lens 22 to be maintained in proper position for focusing the far object.

Of course, if lens 22 was originally adjusted for a relatively far object, when a near object was to be photographed, more reflected light will strike photoreceptor 42 than photoreceptor 41. This produces a difference signal of opposite polarity which causes motor 51 to rotate sleeve 21 in a clockwise direction. Accordingly, lens 22 will be moved away from enclosure 11, thereby bringing the near object into focus automatically.

In operation, camera 10 automatically focuses a selected object upon energization of electric motor 51. Motor 51 effectuates movement of circular gear 52, which engages teeth 23 to rotate sleeve 21. Rotation of sleeve 21 causes lens 22 to move toward a position which brings object 50 into focus. The rotation of sleeve 21 also causes reception means 40 to pivot relative to sleeve 21, thereby equalizing the light reflected onto photoreceptors, 41, 42. When this light is equalized, the electrical signals produced by photoreceptors 41, 42 are also equal, causing an absolutely minimal difference signal to be produced. Being of such minimal strength, the difference signal is insufficient to energize motor 51. Accordingly, sleeve 21, and hence lens 22 remain in position corresponding to the proper focusing of object 50.

Though the exemplary embodiment herein disclosed is preferred, it will be apparent to those skilled in the art that numerous modifications and refinements which do not part from the true scope of the invention can be conceived. All such modifications and refinements are intended to be covered by the appended claims.

We claim:

1. In a photographic apparatus having a lens movable along an axis for focusing an object to be photographed, emission means secured to said apparatus for emitting a light beam toward said object, at least two photoreceptor means each adapted to receive a portion of said light beam reflected from said object for respectively producing electrical signals corresponding to said portion of said light beam so received, and means responsive to said electrical signals, adapted to produce a difference signal corresponding to the extent to which said object is out of focus, the combination of:
   rotatable sleeve means, controlled by said difference signal, for effectuating the movement of said lens along said axis to bring said object into focus; and
   assembly means, carrying said photoreceptor means, movably secured to said apparatus for adjusting the light reflected from said object and received by said photoreceptor means by an amount corresponding to the rotation of said sleeve means, thereby changing said difference signal to maintain said object in focus.

2. The photographic apparatus defined in claim 1 wherein said sleeve means include a peripheral track of predetermined pitch, and wherein said assembly includes cam means cooperating with said track upon rotation of said sleeve means.

3. The photographic apparatus defined in claim 1 further including a photoreceptor lens carried by said assembly means in advance of said photoreceptor means, for focusing light reflected from said object on said photoreceptor means.

4. The photographic apparatus defined in claim 1 further including mechanical means, responsive to said electrical signals, for automatically rotating said sleeve means, and switch means, cooperating with said sleeve means, for de-energizing said mechanical means upon rotation of said sleeve means beyond a predetermined limit.

5. In a photographic apparatus having a lens movable along an axis for focusing an object to be photographed, emission means secured to said apparatus for emitting a light beam toward said object, and photoreceptor means adapted to receive light reflected from said object and further adapted to produce electrical signals corresponding to the extent to which said object is out of focus, the combination of:
   rotatable sleeve means, having a peripheral track of predetermined pitch, controlled by said electrical signals for effectuating the movement of said lens along said axis to bring said object into focus; and
   assembly means carrying said photoreceptor means, pivotably secured to said apparatus; said assembly means having a cam cooperating with said track upon rotation of said sleeve means for adjusting the light received by said photoreceptor means by an amount corresponding to the rotation of said sleeve means, thereby changing said electrical signals to maintain said object in focus.

6. The photographic apparatus devined in claim 5 further including mechanical means, responsive to said electrical signals, for automatically rotating said sleeve means, and switch means, cooperating with said sleeve means, for de-energizing said mechanical means upon rotation of said sleeve means beyond a predetermined limit.

7. The photographic apparatus defined in claim 6 wherein said switch means include first and second normally closed limit switches; said first limit switch being adapted to open when said sleeve means are rotated to a position at which said lens is adjusted for focusing an object at a distance of less than a predetermined near distance, and said second limit switch being adapted to open when said sleeve means are rotated to a position at which said lens is adjusted for focusing an object at a distance in excess of a predetermined far distance.

8. The photographic apparatus defined in claim 7 wherein said first limit switch comprises a first pair of normally closed contacts and said second limit switch comprises a second pair of normally closed contacts; and wherein said sleeve means include pressure means for urging said first pair of contacts apart when said sleeve means are rotated to a position at which said lens is adjusted for focusing an object at a distance less than said predetermined near distance, and urging said second pair of contacts apart when said sleeve means are rotated to a position at which said lens is adjusted for focusing an object at a distance greater than said predetermined far distance.

9. The photographic apparatus defined in claim 6 further including a photoreceptor lens carried by said assembly means in advance of said photoreceptor means, for focusing light reflected from said object on said photoreceptor means.

10. In an optical instrument having focusable means defining an optical axis, along which an image of a remote object is focused on an image plane, said focusable means including a lens adjustable along said optical axis for imaging said object in "in-focus" condition on said image plane; emitter means secured to said instrument spaced from said focusable means for emitting a light beam toward said object; photoreceptor means including at least two light receiving elements, each adapted to receive a portion of said light reflected from said object and each adapted to pass an electrical signal to means for producing a difference signal; and means for adjusting the focus of said lens, the combination of:

sleeve means, responsive to said difference signal, coupled to said focusable means for effectuating the movement of said lens along said axis to bring the image of said object into in-focus condition on said plane; and assembly means, carrying said photoreceptor means, and being adjustable angularly in proportion to adjustment of said sleeve means for adjusting the reflected light received by said photoreceptor means thereby energizing and de-energizing said means for adjusting the focus of said focusable means.

11. The optical instrument as in claim 10 wherein said photoreceptor means is adjustable at a predetermined angle relative to said optical axis and corresponding to said "in-focus" condition of said lens relative to said object.

12. The optical instrument as in claim 10 wherein said photoreceptor means includes means for effectuating receiving said reflected light beam at both a predetermined near distance and a predetermined far distance.

13. In a photographic apparatus having a lens movable along an axis for focusing an object to be photographed, emission means secured to said apparatus for emitting a light beam toward said object, and photoreceptor means adapted to receive light reflected from said object and further adapted to produce electrical signals corresponding to the extent to which said object is out of focus, the combination of:

rotatable sleeve means including a peripheral track of predetermined pitch, controlled by said electrical signals, for effectuating the movement of said lens along said axis to bring said object into focus; and assembly means, including cam means cooperating with said track upon rotation of said sleeve means, carrying said photoreceptor means for adjusting the light received by said photoreceptor means by an amount corresponding to the rotation of said sleeve means, thereby changing said electrical signals to maintain said object in focus.

14. The photographic apparatus defined in claim 13 further including a photoreceptor lens carried by said assembly means in advance of said photoreceptor means, for focusing light reflected from said object on said photoreceptor means.

15. The photorgraphic apparatus defined in claim 13 further including mechanical means, responsive to said electrical signals, for automatically rotating said sleeve means, and switch means, cooperating with said sleeve means, for de-energizing said mechanical means upon rotation of said sleeve means beyond a predetermined limit.

* * * * *